United States Patent
Kaplanis et al.

(10) Patent No.: US 11,429,196 B2
(45) Date of Patent: Aug. 30, 2022

(54) KEYBOARD WITH INPUT MODES

(71) Applicant: Hewlett-Packard Development Company, L.P., Spring, TX (US)

(72) Inventors: Anthony Kaplanis, Spring, TX (US); John W. Frederick, Spring, TX (US); Alexander Williams, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,319

(22) PCT Filed: Jul. 24, 2019

(86) PCT No.: PCT/US2019/043175
§ 371 (c)(1),
(2) Date: Jun. 29, 2021

(87) PCT Pub. No.: WO2021/015752
PCT Pub. Date: Jan. 28, 2021

(65) Prior Publication Data
US 2022/0137719 A1    May 5, 2022

(51) Int. Cl.
*G06F 3/02* (2006.01)
*H04L 51/58* (2022.01)
*H04W 4/14* (2009.01)
*G06F 3/023* (2006.01)

(52) U.S. Cl.
CPC .......... *G06F 3/0219* (2013.01); *G06F 3/0231* (2013.01); *H04L 51/38* (2013.01); *H04W 4/14* (2013.01)

(58) Field of Classification Search
None
See application file for complete search history.

(56) References Cited

U.S. PATENT DOCUMENTS 9,817,442 B2    11/2017    Tan
9,977,594 B2    5/2018    Huh
(Continued)

FOREIGN PATENT DOCUMENTS

CN    202153331 U    *    2/2012
CN    104020856 A        9/2014
(Continued)

OTHER PUBLICATIONS

Razer DeathStalker Ultimate Gaming Keyboard, Switchblade User Interface Keyboard, Razer Australia, retrieved Apr. 1, 2019, 12 pages, available at: https://www2.razer.com/au-en/gaming-keyboards-keypads/razer-deathstalker-ultimate#gallery.
(Continued)

*Primary Examiner* — Kirk W Hermann
(74) *Attorney, Agent, or Firm* — Brooks Cameron & Huebsch PLLC (57) ABSTRACT

A keyboard includes a processing resource and a memory resource storing machine-readable instructions to cause the processing resource to communicate, in response to the keyboard being in a computing device input mode, with a computing device connected to the keyboard, and communicate, in response to the keyboard being in a mobile device input mode, with a mobile device connected to the keyboard.

14 Claims, 4 Drawing Sheets

(56) References Cited

U.S. PATENT DOCUMENTS

| | | | |
|---|---|---|---|
| 2006/0176281 A1* | 8/2006 | Bennett | G06F 3/0231 |
| | | | 345/169 |
| 2011/0047459 A1 | 2/2011 | Van Der Westhuizen | |
| 2016/0187999 A1* | 6/2016 | Chiu | G06F 3/16 |
| | | | 345/168 |
| 2016/0321448 A1* | 11/2016 | Hsu | G06F 3/0231 |
| 2017/0230453 A1* | 8/2017 | Verma | H04N 21/63 |
| 2017/0351341 A1* | 12/2017 | Norwalk | G06F 3/0202 |
| 2018/0032203 A1 | 2/2018 | Sepulveda et al. | |

FOREIGN PATENT DOCUMENTS

| | | | | |
|---|---|---|---|---|
| CN | 105159468 A | * | 12/2015 | |
| CN | 105159486 A | | 12/2015 | |
| CN | 107368197 A | | 11/2017 | |
| CN | 108829258 A | * | 11/2018 | G06F 13/4068 |
| CN | 108829258 A | | 11/2018 | |
| WO | WO-2007067195 A9 | | 11/2011 | |
| WO | WO-2018022050 A1 | * | 2/2018 | G06F 1/1632 |

OTHER PUBLICATIONS

Roccat® Skeltr, Smart Communication RGB Gaming Keyboard, Roccat GmbH, retrieved Apr. 1, 2019, 9 pages, available at: https://en.roccat.org/Keyboards/Skeltr.

Weytec Smart Touch Keyboard, Weytec, Workplace Optimization, 1 page.

* cited by examiner

KEYBOARD WITH INPUT MODES

BACKGROUND

A keyboard can be utilized as an input device for an electronic device. For example, a keyboard can be utilized to provide inputs for letters, numbers, and/or other symbols and/or characters to an electronic device, among other possibilities. Examples of electronic devices having a keyboard can include laptop computers, desktop computers, and/or mobile devices, among other types of electronic devices.

DETAILED DESCRIPTION

A user can utilize a keyboard to communicate information to an electronic device, such as a computing device. As used herein, the term "keyboard" can, for example, refer to a device utilizing an arrangement of buttons (e.g., keys) to input information into a computing device. As used herein, the term "computing device" can be, for example, a laptop computer, a notebook, a desktop computer, and/or a mobile device (e.g., a smart phone, tablet, personal digital assistant, smart glasses, a wrist-worn device, etc.), among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

A user may utilize the keyboard to input information to a computing device. For example, a user may be working using a computing device at the user's workstation by inputting information to the computing device.

A user of a computing device may interact with a mobile device while using their computing device. For example, a user may receive a text message, a phone call, or perform any other type of interaction with their mobile device, which may occur while the user is at their workstation. In order to interact with the mobile device, the user primarily handles the mobile device directly. For example, when a user receives a text message via their mobile device, the user may pick up their mobile device to read and/or respond to the text message.

However, direct interaction with the mobile device by the user can disrupt a user's workflow. For example, direct interaction with a user's mobile device can cause a user to refocus from their workstation to their mobile device, which can break a user's concentration and/or reduce productivity.

A keyboard with input modes, according to the disclosure, can allow for bidirectional communication between a user's keyboard and mobile device by allowing the keyboard to communicate with the mobile device and the computing device based on an input mode of the keyboard. This can allow a user to interact with the user's mobile device and computing device seamlessly through the user's keyboard, which can prevent breaks in concentration and/or increase user productivity.

Figure 1:
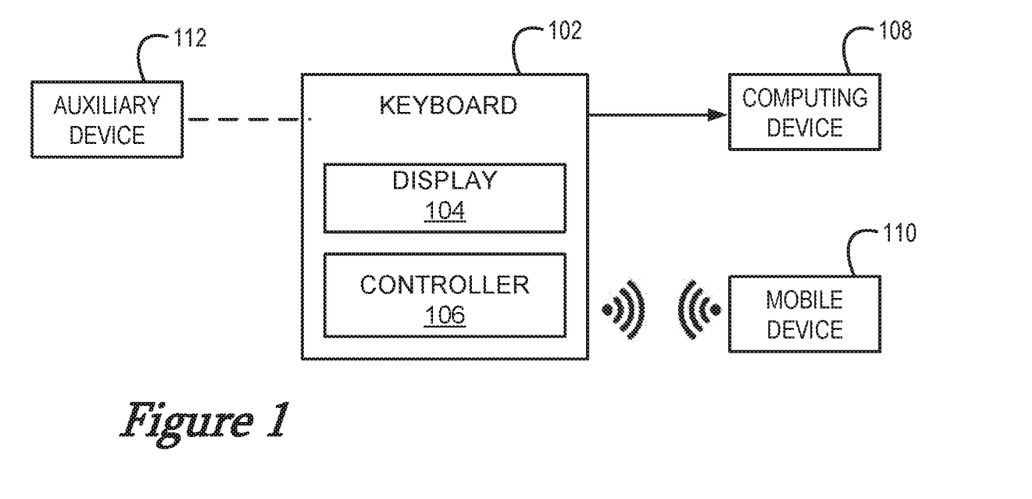
FIG. 1 illustrates an example of a system for a keyboard with input modes consistent with the disclosure.

FIG. 1 illustrates an example of a system 100 for a keyboard 102 with input modes consistent with the disclosure. The system 100 can include a keyboard 102, a computing device 108, a mobile device 110, and an auxiliary device 112. The keyboard 102 can include a display 104 and a controller 106.

As illustrated in FIG. 1, the keyboard 102 can be connected with a computing device 108 and a mobile device 110, and in some examples, an auxiliary device 112. As described above, although not illustrated in FIG. 1, the keyboard 102 can include an arrangement of keys to input information into the computing device 108, such as letters, numbers, symbols, characters, and/or combinations thereof.

The keyboard 102 can include a display 104 for a keyboard with input modes, as is further described herein. The display 104 can provide (e.g., display and/or present) information to the user of the keyboard 102, and/or receive information from (e.g., input by) the user of the keyboard 102. For instance, in some examples, the display 104 can include a graphical user interface (GUI) that can provide information to and/or receive information from the user of the keyboard 102. The display 104 can be, for instance, a touchscreen (e.g., the GUI can include touchscreen capabilities). The display 104 can be any type of display device connected to the keyboard 102 to receive a video signal output from the keyboard 102, the computing device 108, and/or the mobile device 110.

As illustrated in FIG. 1, the keyboard 102 can be simultaneously connected to the computing device 108 and the mobile device 110. The keyboard 102 can be connected to the computing device 108 via a wired connection. The keyboard 102 can simultaneously be connected with the computing device 108 via the wired connection and wirelessly connected to the mobile device 110 via a wireless connection.

The wireless connection between the keyboard 102 and the mobile device 110 can be a Bluetooth connection. For example, the keyboard 102 and the mobile device 110 can communicate with each other via a Bluetooth connection. However, examples of the disclosure are not so limited. For example, the wireless connection between the keyboard 102 and the mobile device 110 can be any other type of network relationship, including a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Worldwide Interoperability for Microwave Access (WMAX), infrared (IR) communication, Public Switched Telephone Network (PSTN), radio waves, and/or the Internet, among other types of network relationships.

Although the keyboard 102 and the computing device 108 are described as being connected by a wired connection, examples of the disclosure are not so limited. For example, the keyboard 102 and the computing device 108 can be wirelessly connected via a network relationship. In other words, the keyboard 102 can be simultaneously wirelessly connected to both the computing device 108 and the mobile device 110.

Additionally, although the keyboard 102 and the mobile device 110 are described as being connected by a wireless connection, examples of the disclosure are not so limited. For example, the keyboard 102 and the mobile device 110 can be connected by a wired connection. In other words, the keyboard 102 can be simultaneously connected to both the computing device 108 by a wired or wireless connection, as well as connected to the mobile device 110 by a wired connection.

The keyboard 102 can communicate, in response to the keyboard 102 being in a computing device input mode, with the computing device 108 connected to the keyboard 102. As used herein, the term "communicate" refers to transmission of data from one device to another device. For example, the keyboard 102 can transmit information (e.g., data) to the computing device 108 while the keyboard 102 is in the computing device input mode, as is further described herein.

As used herein, the term "mode" refers to a distinct setting in which a same input produces different results in different modes. As used herein, the term "computing device input mode" refers to an input mode of the keyboard 102 in which an input to the keyboard 102 produces a result relating to the computing device 108. Additionally, as used herein, the term "mobile device input mode" refers to an input mode of the keyboard 102 in which an input to the keyboard 102 produces a result relating to the mobile device 110. For example, the character input of the word "Thanks" into the keyboard 102 while the keyboard 102 is in the computing device input mode can produce a different result (e.g., a result on the computing device 108) than when the character input of the word "Thanks" into the keyboard 102 is performed while the keyboard 102 is in the mobile device input mode (e.g., a result on the mobile device 110), as is further described herein.

Communicating, by the keyboard 102 with the computing device 108, can include inputting information to the computing device 108. For example, a user may type an input into the keyboard 102 while the keyboard 102 is in the computing device input mode and as a result, the keyboard 102 can transmit information (e.g., data) to the computing device 108. For instance, a user may be drafting and/or editing a text document by entering letters, numbers, and/or other symbols and/or characters into the text document via the keyboard 102, and the entered letters, numbers, and/or other symbols and/or characters can be transmitted from the keyboard 102 to the computing device 108.

Additionally, communicating, by the keyboard 102 with the computing device 108, can include receiving information from the computing device 108 while the keyboard 102 is in the computing device input mode. For example, the computing device 108 may transmit information to the keyboard 102 which may be displayed by the display 104 of the keyboard 102.

The controller 106 can determine whether the keyboard 102 is connected with the mobile device 110. For example, the controller 106 can determine whether the keyboard 102 is connected with the mobile device 110 by determining whether the mobile device 110 has signaled the controller 106. The mobile device 110 can signal the controller 106 to determine whether it is connected to (e.g., paired with) the controller 106 (e.g., when the mobile device 110 receives a text message) and in response, attempt to route the received text message to the keyboard 102. In response to the keyboard 102 being connected to the mobile device 110 and the mobile device 110 receiving the text message, the keyboard 102 can receive the contents of the received text message, as is further described herein.

The controller 106 can cause the keyboard 102 to switch from the computing device input mode to the mobile device input mode. The controller 106 can cause the keyboard 102 to switch to the mobile device input mode in response to the mobile device 110 receiving a text message and/or a user input to the keyboard 102. A text message can include a short message service (SMS) message and/or a multimedia messaging service (MMS) message. As used herein, the term "SMS message" can, for example, refer to a text messaging service component using standardized communication protocols to enable text messages to be sent and/or received between devices. As used herein, the term "MMS message" can, for example, refer to a text messaging service component using standardized communication protocols to enable text messages that may include media content to be sent and/or received between devices.

For example, a user may be utilizing the keyboard 102 to communicate with the computing device 108 in the computing device input mode. For instance, the user of the keyboard 102 may be drafting a text document utilizing inputs to the keyboard 102 which are transmitted to the computing device 108, and at a certain time receive a text message on the user's mobile device 110, In other words, the controller 106 can cause the keyboard 102 to automatically switch from the computing device input mode to the mobile device input mode in response to the mobile device 110 receiving a text message.

In some examples, the controller 106 can cause the keyboard 102 to automatically switch from the computing device input mode to the mobile device input mode for a predetermined amount of time in response to the mobile device 110 receiving the text message. For example, the mobile device 110 can receive the text message and the controller 106 can cause the keyboard 102 to automatically switch from the computing device input mode to the mobile device input mode for ten minutes. After the predetermined amount of time expires (e.g., ten minutes), the controller 106 can cause the keyboard 102 to automatically switch from the mobile device input mode to the computing device input mode.

Although the predetermined amount of time is described above as being ten minutes, examples of the disclosure are not so limited. For example, the predetermined amount of time can be less than ten minutes or more than ten minutes. Further, the predetermined amount of time can be modifiable (e.g., by a user input, in some examples).

In some examples, the user may be drafting a text document or performing some other task and wishes to switch from the computing device input mode to the mobile device input mode. The keyboard 102 can receive a user input (e.g., via the display 104, via a mechanical switch on the keyboard 102, and/or via some other input mechanism) such that the controller 106 can cause the keyboard 102 to switch to the mobile device input mode.

In some examples, the user input to the keyboard 102 can be a predetermined word or abbreviation. For instance, common words and/or abbreviations utilized in mobile device text communication may cause the keyboard 102 to switch from the computing device input mode to the mobile device input mode. For example, a user may type "lol" into the keyboard 102, which can be a common abbreviation for "laugh out loud" utilized in mobile device text communication. Upon the entry of the common word and/or abbreviation, the controller 106 can cause the keyboard 102 to automatically switch from the computing device input mode to the mobile device input mode. In response to the common word and/or abbreviation, the keyboard 102 may be in the mobile device input mode until a user input to change to the keyboard input mode, may be in the mobile device input mode for a predetermined period of time, etc. In some examples, the common word and/or abbreviation may be transmitted to the mobile device 110 while other text input may be transmitted to the computing device 108. For instance, the text "lol" may be sent to the mobile device 110 while other inputs may be sent to the computing device 108 in response to the common word and/or abbreviation.

The keyboard 102 can communicate, in response to the keyboard 102 being in the mobile device input mode, with the computing device 108 connected to the keyboard 102. For example, the keyboard 102 can transmit and/or receive information (e.g., data) to the wirelessly connected mobile device 110 while the keyboard 102 is in the mobile device input mode, as is further described herein.

Communicating, by the keyboard 102 with the mobile device 110, can include receiving information from the mobile device 110 while the keyboard 102 is in the mobile device input mode. For instance, continuing with the example from above, a user may receive a text message via the user's mobile device 110. Upon the keyboard 102 switching to the mobile device input mode (e.g., automatically or via a user input), the keyboard 102 can communicate with the mobile device 110 by receiving information (e.g., data) such as the contents of the text message from the mobile device 110.

Communicating, by the keyboard 102 with the mobile device 110, can include inputting information to the mobile device 110. For example, a user may type an input into the keyboard 102 while the keyboard 102 is in the mobile device input mode and as a result, the keyboard 102 can transmit information (e.g., data) to the mobile device 110. For instance, a user may respond to the received text message by entering letters, numbers, and/or other symbols and/or characters via the keyboard 102, and the entered letters, numbers, and/or other symbols and/or characters can be transmitted from the keyboard 102 to the mobile device 110. The entered letters, numbers, and/or other symbols and/or characters can be input via keys of the keyboard 102, as is further described in connection with FIG. 2.

As described above, the mobile device 110 may receive a text message and the keyboard 102 can switch from the computing device input mode to the mobile device input mode. Once the keyboard 102 communicates with the mobile device 110 to receive information such as the contents of the text message, the controller 106 can cause the contents of the text message to be displayed via the display 104. For example, the mobile device 110 may receive a text message that reads "Thanks", and the text "Thanks" can be displayed on the display 104 of the keyboard 102, As another example, the mobile device 110 may receive a text message with an image (e.g., a photo, an emoticon, etc.), and the image can be displayed on the display 104 of the keyboard 102.

Once the keyboard 102 communicates with the mobile device 110 to receive the information such as the contents of the text message, the user of the keyboard 102 can acknowledge the incoming text message. For example, the user may indicate, via a user input to the keyboard 102 (e.g., via a keystroke, key combination, input to the display 104, etc.), an acknowledgment that the text message has been received. The acknowledgment can be transmitted to the mobile device 110, which can cause the mobile device 110 to clear the notification, prevent further notifications from being displayed, transmitted, etc., to the user regarding the text message, among other actions.

As described above, a user can input information to the keyboard 102 such as a response to the text message. For example, a user may compose an original text message, type a reply to the contents of a received text message, etc. via the keyboard 102, and the contents of the composed text message/reply to the received text message can be displayed via the display 104 of the keyboard 102. As described above, the keyboard 102 can communicate with the mobile device 110 by transmitting the text message to the mobile device 110, The controller 106 can cause the mobile device 110 to transmit the text message, as is further described in connection with FIG. 2.

Although communicating, by the keyboard 102 with the mobile device 110, is described above as receiving and/or transmitting text messages, examples of the disclosure are not so limited. For example, communicating with the mobile device 110 by the keyboard 102 while the keyboard 102 is in the mobile device input mode can include causing an incoming phone call at the mobile device 110 to be answered, controlling audio playback from the mobile device 110, manipulating a user interface (UI) of the mobile device 110, among other actions as is further described herein. As used herein, the term "UI" refers to an interface that can provide information to and/or receive information from a user.

Communicating, by the keyboard 102 with the mobile device 110, can include causing an incoming phone call at the mobile device 110 to be answered. For example, a user may be inputting information into the computing device 108 via the keyboard 102 while the keyboard 102 is in the computing device input mode when the user's mobile device 110 receives a phone call. The keyboard 102 can switch to the mobile device input mode and the keyboard 102 can receive, via a user input, an input to cause the keyboard 102 to communicate with the mobile device 110 to cause the mobile device 110 to answer the incoming phone call. The user can then utilize the mobile device 110, a headset connected to the keyboard 102 (e.g., an auxiliary device 112, as is further described herein), among other devices to take the phone call.

Communicating, by the keyboard 102 with the mobile device 110, can include controlling audio playback from the mobile device 110. For example, the mobile device 110 may be used for streaming audio (e.g., music, video, podcasts, etc.), and the keyboard 102 can pause, stop, start, skip, resume, and/or cause other playback functions to occur on the mobile device 110.

Communicating, by the keyboard 102 with the mobile device 110, can include manipulating a UI of the mobile device 110. For example, a user may utilize the arrow keys of the keyboard 102 to select an application, switch between applications, select and/or modify content on the mobile device 110, among other actions.

The keyboard 102 can switch from the mobile device input mode to the computing device input mode in response to a user input. For example, a user has input a response to a text message and the keyboard 102 has communicated (e.g., transmitted) the response to the text message to the mobile device 110. The keyboard 102 can switch from the mobile device input mode to the computing device input mode in response to a user input to the keyboard 102 or in response to a user input to the mobile device 110, as is further described herein.

In some examples, the keyboard 102 can switch from the mobile device input mode to the computing device input mode in response to a user input to the keyboard 102. For example, the keyboard 102 can receive a user input via the display 104, via a mechanical switch (e.g., not illustrated in FIG. 1) included on the keyboard 102, via a keypress (e.g., by pressing a certain key, key combination, etc.), among other examples of user inputs to the keyboard 102. In some examples, the keyboard 102 can switch from the mobile device input mode to the computing device input mode in response to a user input to the mobile device 110.

As illustrated in FIG. 1, in some examples the keyboard 102 can be connected to an auxiliary device. As used herein, the term "auxiliary device" refers to a device that provides input/output (I/O) functions for a computing device. For example, the auxiliary device 112 can be a mouse, gaming controller, headset, among other types of peripheral devices.

The keyboard 102 can communicate with the mobile device 110 via the auxiliary device 112. In some examples, a user can utilize the auxiliary device 112 (e.g., a mouse, gaming controller, etc.) to manipulate the UI of the mobile device 110, including selecting an application, switching between applications, selecting and/or modifying content on the mobile device 110, among other actions. In some examples, a user can utilize the auxiliary device 112 (e.g., a headset) to listen to audio playback from mobile device 110 (e.g., music, video, podcasts, etc.), listen to text-to-voice renderings of a text message received by the mobile device 110, cause a voice input to a microphone of the headset to be converted to text to reply to/compose a text message, among other examples.

Keyboard with input modes, according to the disclosure, can allow for bidirectional communication between a user's keyboard (and/or an auxiliary device connected to the user's keyboard) and a mobile device based on an input mode of the keyboard. Such communication can allow for a user to seamlessly interact with the keyboard as well as the user's mobile device, which can increase user productivity.

Figure 2:
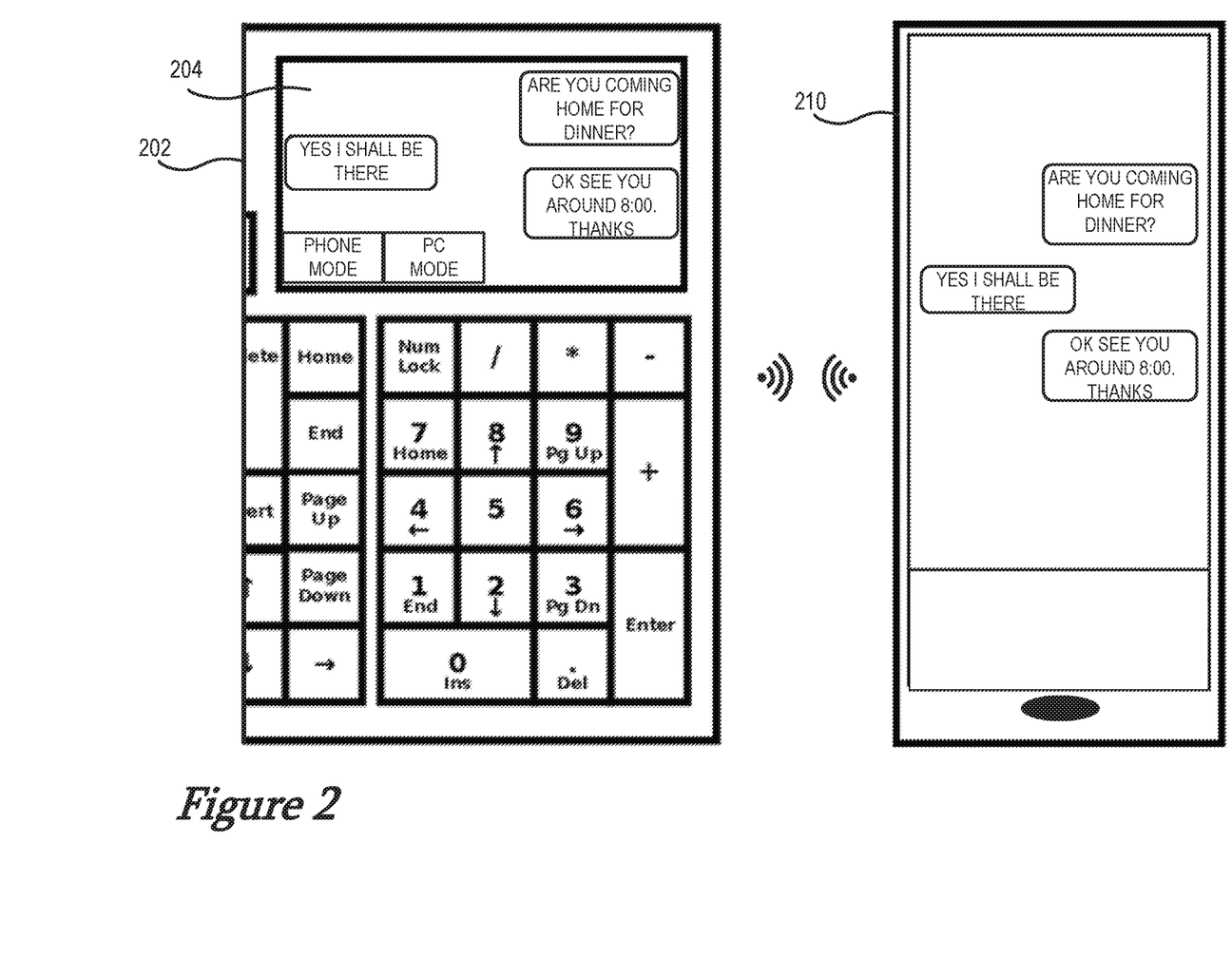
FIG. 2 illustrates an example of a mobile device and a portion of a keyboard for a keyboard with input modes consistent with the disclosure.

FIG. 2 illustrates an example of a mobile device 210 and a portion of a keyboard 202 for a keyboard with input modes consistent with the disclosure. As illustrated in FIG. 2, the keyboard 202 can include a display 204.

As previously described in connection with FIG. 1, the keyboard 202 can communicate with a computing device in a computing device input mode (e.g., illustrated in FIG. 2 as "PC Mode") and communicate with the mobile device 210 in a mobile device mode (e.g., illustrated in FIG. 2 as "Phone Mode"). For example, a user may be drafting a text document on the computing device utilizing the keyboard 202 in the computing device input mode and receive a text message via the mobile device 210. The contents of the text message can be displayed on display 204. For example, the mobile device 210 can receive at text message that reads "Are you coming home for dinner?", and the display 204 can display the text "Are you coming home for dinner?".

The keyboard 202 can switch from the computing device input mode to the mobile device input mode such that the user can respond to the text message. For example, the keyboard 202 can receive text input via the keys of the keyboard 202. For instance, the user may desire to respond to the text message and input the text "Yes I shall be there" via the keys of the keyboard 202. The display 204 of the keyboard 202 can display the text input "Yes I shall be there" on the display 204 such that the user can see the text input.

A controller of the keyboard 202 (e.g., not illustrated in FIG. 2) can cause the displayed text input to be transmitted to the mobile device 210. For example, as illustrated in FIG. 2, the text input "Yes I shall be there" can be displayed on a display of the mobile device 210. If the user is satisfied with the text input, the controller of the keyboard 202 can cause the mobile device 210 to transmit the text message. Further, as illustrated in FIG. 2, if and/or when the mobile device 210 receives a response to the text message (e.g., the text "Ok See you around 8:00. Thanks", the contents of the response can be transmitted from the mobile device 210 to the keyboard 202 and displayed on the display 204. For instance, the text of the response "Ok See you around 8:00, Thanks" can be displayed on the display 204 of the keyboard 202. A user may again respond to the text message utilizing the keyboard 202 if the user so desires.

Figure 3:
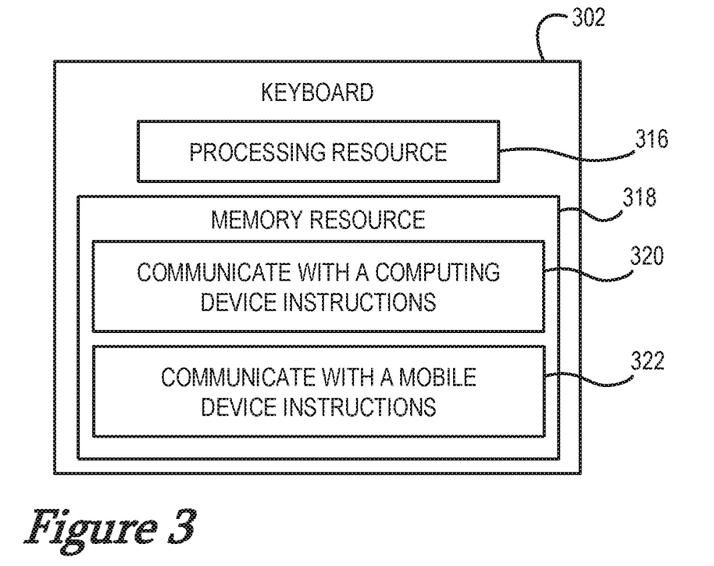
FIG. 3 illustrates an example of a keyboard for a keyboard with input modes consistent with the disclosure.

FIG. 3 illustrates an example of a keyboard 302 for a keyboard with input modes consistent with the disclosure. As described herein, the keyboard 302 may perform functions related to a keyboard with input modes. Although not illustrated in FIG. 3, the keyboard 302 may include a processor and a machine-readable storage medium. Although the following descriptions refer to a single processor and a single machine-readable storage medium, the descriptions may also apply to a system with multiple processors and multiple machine-readable storage mediums. In such examples, the keyboard 302 may be distributed across multiple machine-readable storage mediums and the keyboard 302 may be distributed across multiple processors. Put another way, the instructions executed by the keyboard 302 may be stored across multiple machine-readable storage mediums and executed across multiple processors, such as in a distributed or virtual computing environment.

Processing resource 316 may be a central processing unit (CPU), a semiconductor-based microprocessor, and/or other hardware devices suitable for retrieval and execution of machine-readable instructions 320, 322 stored in a memory resource 318. Processing resource 316 may fetch, decode, and execute instructions 320, 322. As an alternative or in addition to retrieving and executing instructions 320, 322, processing resource 316 may include a plurality of electronic circuits that include electronic components for performing the functionality of instructions 320, 322.

Memory resource 318 may be any electronic, magnetic, optical, or other physical storage device that stores executable instructions 320, 322 and/or data. Thus, memory resource 318 may be, for example, Random Access Memory (RAM), an Electrically-Erasable Programmable Read-Only Memory (EEPROM), a storage drive, an optical disc, and the like. Memory resource 318 may be disposed within keyboard 302, as shown in FIG. 3. Additionally, memory resource 318 may be a portable, external or remote storage medium, for example, that causes keyboard 302 to download the instructions 320, 322 from the portable/external/remote storage medium.

The keyboard 302 may include instructions 320 stored in the memory resource 318 and executable by the processing resource 316 to communicate, in response to the keyboard being in a computing device input mode, with a computing device connected to the keyboard. A user may type an input into the keyboard 302 while the keyboard 302 is in the computing device input mode and as a result, the keyboard 302 can transmit information (e.g., data) to the computing device. For instance, a user may be drafting and/or editing a text document by entering letters, numbers, and/or other symbols and/or characters into the text document via the keyboard 302, and the entered letters, numbers, and/or other symbols and/or characters can be transmitted from the keyboard 302 to the computing device.

The keyboard 302 may include instructions 322 stored in the memory resource 318 and executable by the processing resource 316 to communicate, in response to the keyboard 302 being in a mobile device input mode, with a mobile device connected to the keyboard 302. Communicating by the keyboard 302 with the mobile device can include receiving information from the mobile device while the keyboard 302 is in the mobile device input mode. For instance, a user may receive a text message via the user's mobile device. Upon the keyboard 302 switching to the mobile device input mode (e.g., automatically or via a user input), the keyboard 302 can communicate with the mobile device by receiving information (e.g., data) such as the contents of the text message from the mobile device.

Further, communicating, by the keyboard 302 with the mobile device can include inputting information to the mobile device. For example, a user may type an input into the keyboard 302 while the keyboard 302 is in the mobile device input mode and as a result, the keyboard 302 can transmit information (e.g., data) to the mobile device. For instance, a user may respond to the received text message by entering letters, numbers, and/or other symbols and/or characters via the keyboard 302, and the entered letters, numbers, and/or other symbols and/or characters can be transmitted from the keyboard 302 to the mobile device.

Figure 4:
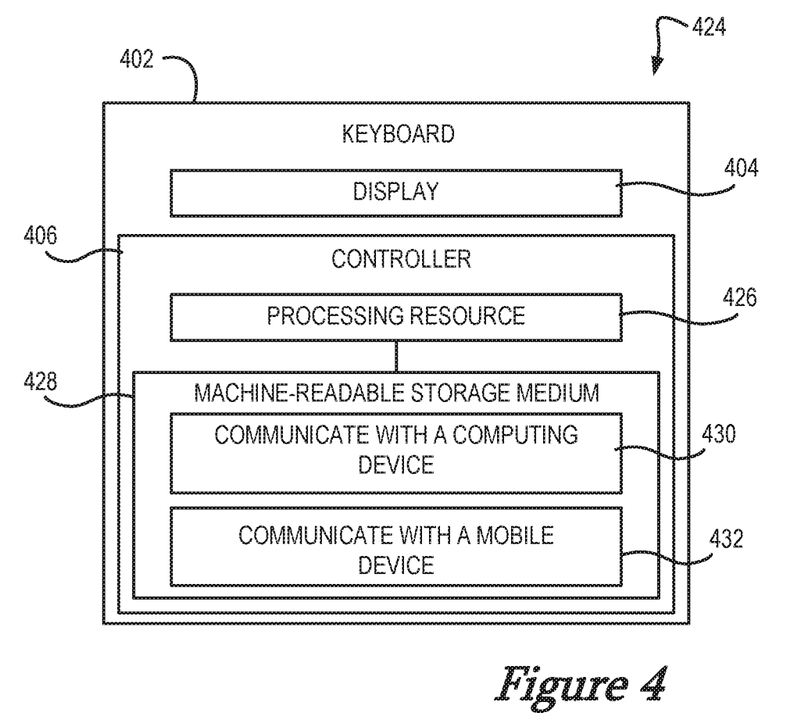
FIG. 4 illustrates a block diagram of an example system consistent with the disclosure.

FIG. 4 illustrates a block diagram of an example system 424 consistent with the disclosure. In the example of FIG. 4, system 424 includes a keyboard 402 having a display 404 and a controller 406. The controller 406 can include a processing resource 426 and a machine-readable storage medium 428. Although the following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processing resource 426 may be a central processing unit (CPU), microprocessor, and/or other hardware device suitable for retrieval and execution of instructions stored in machine-readable storage medium 428. In the particular example shown in FIG. 4, processing resource 426 may receive, determine, and send instructions 430, 432. As an alternative or in addition to retrieving and executing instructions, processing resource 426 may include an electronic circuit comprising a number of electronic components for performing the operations of the instructions in machine-readable storage medium 428. With respect to the executable instruction representations or boxes described and shown herein, it should be understood that part or all of the executable instructions and/or electronic circuits included within one box may be included in a different box shown in the figures or in a different box not shown.

Machine-readable storage medium 428 may be any electronic, magnetic, optical, or other physical storage device that stores executable instructions. Thus, machine-readable storage medium 428 may be, for example, Random Access Memory (RAM), an Electrically-Erasable Programmable Read-Only Memory (EEPROM), a storage drive, an optical disc, and the like. The executable instructions may be "installed" on the system 424 illustrated in FIG. 4. Machine-readable storage medium 428 may be a portable, external or remote storage medium, for example, that allows the system 424 to download the instructions from the portable/external/remote storage medium. In this situation, the executable instructions may be part of an "installation package". As described herein, machine-readable storage medium 428 may be encoded with executable instructions associated with a keyboard with input modes.

Communicate with a computing device instructions 430, when executed by a processor such as processing resource 426, may cause system 424 to communicate with a computing device connected to the keyboard in response to the keyboard being in a computing device input mode. For example, a user may type an input, such as letters, numbers, and/or other symbols and/or characters, into the keyboard 402 while the keyboard 402 is in the computing device input mode and as a result, the keyboard 402 can transmit information (e.g., the entered letters, numbers, and/or other symbols and/or characters) to the computing device.

Communicate with a mobile device instructions 432, when executed by a processor such as processing resource 426, may cause system 424 to communicate with a mobile device connected to the keyboard in response to the keyboard being in a mobile device input mode. Communicating by the keyboard 402 with the mobile device can include receiving information from the mobile device and/or inputting information to the mobile device while the keyboard 402 is in the mobile device input mode. For instance, a user may receive a text message via the user's mobile device and upon the keyboard 402 switching to the mobile device input mode (e.g., automatically or via a user input), the keyboard 402 can communicate with the mobile device by receiving information (e.g., data) such as the contents of the text message from the mobile device. A user may type an input into the keyboard 402 while the keyboard 402 is in the mobile device input mode and as a result, the keyboard 402 can transmit information (e.g., data) to the mobile device. For instance, a user may respond to the received text message by entering letters, numbers, and/or other symbols and/or characters via the keyboard 402, and the entered letters, numbers, and/or other symbols and/or characters can be transmitted from the keyboard 402 to the mobile device. The keyboard 402 can be simultaneously connected to the computing device and the mobile device.

Figure 5:
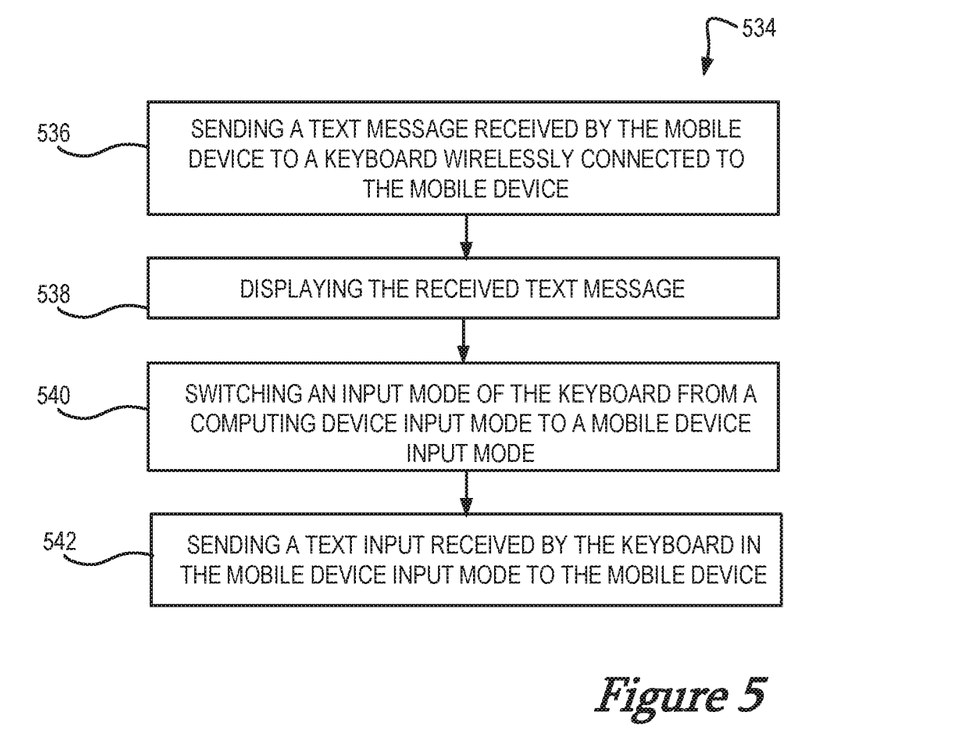
FIG. 5 illustrates an example of a method for a keyboard with input modes consistent with the disclosure.

FIG. 5 illustrates an example of a method 534 for a keyboard with input modes consistent with the disclosure. For example, method 534 can be performed by a controller (e.g., controller 106, previously described in connection with FIG. 1) of a keyboard (e.g., keyboard 102, 202, 302, previously described in connection with FIGS. 1-3, respectively).

At 536, the method 534 includes sending a text message received by the mobile device to a keyboard wirelessly connected to the mobile device. For example, in response to the keyboard being connected to the mobile device and the mobile device receiving a text message, the keyboard can receive the contents of the text message from the mobile device.

At 538, the method 534 includes displaying, by a display of the keyboard, the received text message. For example, the mobile device may receive a text message that reads "Thanks", and the text "Thanks" can be displayed on the display of the keyboard. As another example, the mobile device may receive a text message with an image (e.g., a photo, an emoticon, etc.), and the image can be displayed on the display of the keyboard.

At 540, the method 534 includes switching, by a controller of the keyboard, an input mode of the keyboard from a computing device input mode to a mobile device input mode. The controller can switch the input mode to the mobile device mode automatically or in response to a user input. In some examples, the controller of the keyboard can cause the keyboard to switch from the computing device input mode to the mobile device input mode automatically in response to the mobile device receiving the text message.

In some examples, the controller of the keyboard can cause the keyboard to switch from the computing device input mode to the mobile device input mode in response to a user input to the keyboard (e.g., to a display of the keyboard, via a mechanical switch of the keyboard, via a key or keystroke of the keyboard, etc.).

At 542, the method 534 can include sending, by the keyboard, a text input received by the keyboard in the mobile device input mode to the mobile device. For example, a user may compose an original text message, type a reply to the contents of the received text message, etc. via the keyboard. The contents of the composed text message/reply to the received text message can be displayed via the display of the keyboard and be sent to the mobile device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense. As used herein, the designators "M", "N", and "O", particularly with respect to reference numerals in the drawings, indicate that a plurality of the particular feature so designated can be included with examples of the disclosure. The designators can represent the same or different numbers of the particular features.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A keyboard, comprising:
 a processing resource; and
 a memory resource storing non-transitory machine-readable instructions to cause the processing resource to:
  communicate, in response to the keyboard being in a computing device input mode, with a computing device connected to the keyboard;
  communicate, in response to the keyboard being in a mobile device input mode, with a mobile device connected to the keyboard, wherein the computing device and the mobile device are separate devices; and
  switch the keyboard from the mobile device input mode to the computing device input mode in response to a user input to the mobile device.

2. The keyboard of claim 1, wherein the keyboard is simultaneously connected to the computing device and connected wirelessly to the mobile device.

3. The keyboard of claim 1, wherein the keyboard is:
 connected wirelessly to the computing device; or
 connected to the computing device via a wired connection.

4. The keyboard of claim 1, including instructions to switch the keyboard from the computing device input mode to the mobile device input mode in response to at least one of:
 the mobile device receiving a text message; and
 a user input to the keyboard.

5. The keyboard of claim 1, including instructions to switch the keyboard from the mobile device input mode to the computing device input mode in response to a user input to the keyboard.

6. The keyboard of claim 1, including instructions to communicate with the mobile device by at least one of:
 receiving information from the mobile device; and
 inputting information to the mobile device.

7. The keyboard of claim 1, including instructions to communicate with the computing device by at least one of:
 inputting information to the computing device; and
 receiving information from the computing device.

8. A keyboard, comprising:
 a display; and
 a controller comprising a processing resource that executes non-transitory machine-readable instructions stored in a machine-readable storage medium to cause the controller to:
  communicate, in response to the keyboard being in a computing device input mode, with a computing device connected to the keyboard;
  communicate, in response to the keyboard being in a mobile device input mode, with a mobile device wirelessly connected to the keyboard; and
  switch the keyboard from the mobile device input mode to the computing device input mode in response to a user input to the mobile device;
 wherein:
  the keyboard is simultaneously connected to the computing device and the mobile device; and
  the computing device and the mobile device are separate devices.

9. The keyboard of claim 8, wherein the controller executes the instructions to communicate with the mobile device by at least one of:
 displaying a received text message on the display; and
 sending a text message to the mobile device to be transmitted.

10. The keyboard of claim 8, wherein the controller executes the instructions to communicate with the mobile device by at least one of:
 causing an incoming phone call at the mobile device to be answered;
 controlling audio playback from the mobile device; and
 manipulating a user interface (UI) of the mobile device.

11. The keyboard of claim 8, wherein:
 an auxiliary device is connected to the keyboard; and the controller executes the instructions to communicate with the mobile device via the auxiliary device by manipulating a user interface (UI) of the mobile device with the auxiliary device.

12. A method, comprising:

sending, by a mobile device, a text message received by the mobile device to a keyboard wirelessly connected to the mobile device;

displaying, by a display of the keyboard, the received text message;

switching, by a controller of the keyboard, an input mode of the keyboard from a computing device input mode to a mobile device input mode, wherein:
 the keyboard is connected to a computing device; and
 the computing device and the mobile device are separate devices;

sending, by the keyboard, a text input received by the keyboard in the mobile device input mode to the mobile device; and switching, by the controller of the keyboard, the input mode of the keyboard from the mobile device input mode to the computing device input mode in response to a user input to the mobile device.

13. The method of claim 12, wherein the method includes:

receiving, by the keyboard, the text input via keys of the keyboard;

displaying, by the display of the keyboard, the text input via the keys of the keyboard; and transmitting, by the mobile device, the displayed text input as a transmitted text message.

14. The method of claim 12, wherein the method includes sending, by the mobile device, the text message to the keyboard in response to the keyboard being connected to the mobile device.

* * * * *